June 2, 1964   F. A. PACHMAYR   3,135,064
FIREARM RECOIL PAD
Filed May 21, 1962
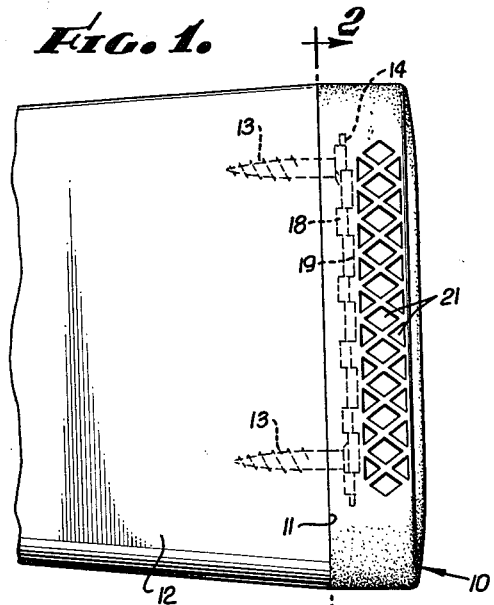
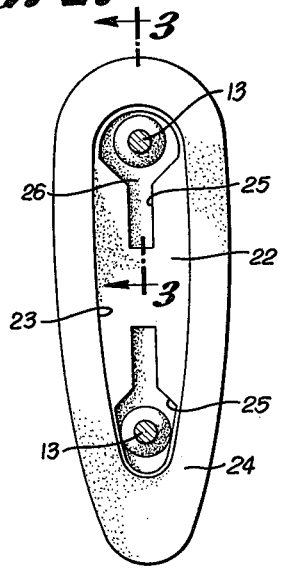
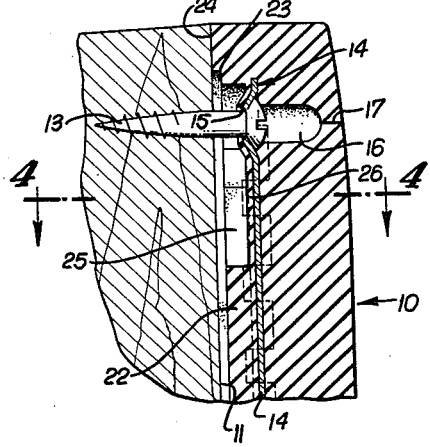
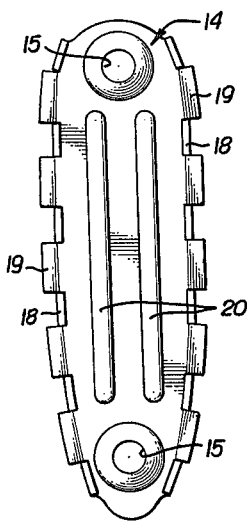
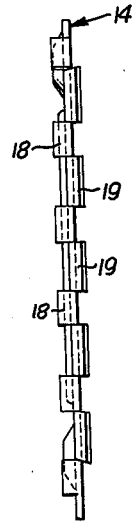
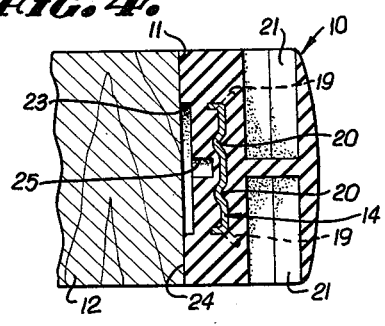
INVENTOR.
FRANK A. PACHMAYR
BY
ATTORNEYS.

United States Patent Office 3,135,064
Patented June 2, 1964

3,135,064
FIREARM RECOIL PAD
Frank A. Pachmayr, Los Angeles, Calif., assignor to Pachmayr Gun Works, Inc., Los Angeles, Calif., a corporation of California
Filed May 21, 1962, Ser. No. 196,056
6 Claims. (Cl. 42—74)

This invention relates to improvements in shoulder pads for firearms, and has for its general object to provide a recoil pad structure of simple and economical construction which by reason of the features contemplated by the invention is rendered capable of efficient and durable service notwithstanding its simplicity.

Generally considered, the invention contemplates an improved recoil pad, the essential components of which are reduced to a rubber cushioning body and an internal attachment and reinforcing plate so constructed as to be assured of sustained strength bondage within the body, and having such placement therein as to be capable of attachment to the gun stock in a manner assuring proper accommodation and retention of cushioning rubber between the plane of the plate and the end face of the stock. The form of plate contemplated is in the nature of a stamping imbedded in the rubber body and peripherally spaced therefrom so that about the plate the full thickness of the rubber is exposed and available for recoil cushioning.

The invention contemplates a particular plate configuration designed not only to have that degree of rigidity for attachment and recoil force distribution, but also for bondage to the rubber with such security as will assure retention of the outer portion of the body about the plate, in tight engagement with the end face of the gun stock. This bondage objective is accomplished by forming the plate with successive oppositely deflected or turned flange segments, one alternate series of which face inwardly of the pad with the other alternate series deflected outwardly in imbedded condition at the inside of the usual lateral cushion voids in the rubber body. Thus the flange segments project in opposite angular relations to assure secure and permanent bondage to the rubber and throughout a continuous course spaced inwardly from but sufficiently close to the peripheral portion and interior of the body as to assure its maintenance in fixed cushioning engagement with the stock. In the interests of permitting formation of the plate of relatively thin sheet stock, while maintaining its desirable rigidity, the plate preferably is longitudinally ribbed between apertures which pass the attachment screws.

All the features and objects of the invention as well as the details of an illustrative embodiment will further appear from the following detailed description of the accompanying drawing in which:

FIG. 1 is a side elevation of the recoil pad applied to a gun stock;

FIG. 2 is an inside face view of the pad taken on line 2—2 of FIG. 1;

FIG. 3 is a fragmentary enlarged cross section on line 3—3 of FIG. 2;

FIG. 4 is a cross section taken on line 4—4 of FIG. 3;

FIG. 5 is an inside face view of the reinforcement and attachment plate; and

FIG. 6 is an edge elevation of FIG. 5 viewed from the right.

The recoil pad generally indicated at 10 is shown to be attached to the end face 11 of the gun stock 12 by screws 13 inserted into the body 10 and passing through the internal plate 14, as will appear.

Referring to FIGS. 2 to 6, the plate 14, which may consist of a steel stamping, has a peripheral configuration generally corresponding to the cross sectional shape of the body 10 in the plane of the plate, but at reduced dimensions, so that the body rubber is continuous about the plate between the inner and outer faces of the body. The plate 14 is provided with openings 15 within countersinks deflected toward the inner face of the pad, the body 10 containing openings or voids 16 at the outside of which the rubber is slitted at 17 to permit insertion of the screws through the apertures 15, and accommodation also of a driver for turning the screws into the stock.

As best illustrated in FIGS. 5 and 6, the plate 14 has peripheral flange segments 18 and 19 formed by deflecting the metal at opposite angularities so as to provide for strong interlock with the rubber of the body to which the plate and its flanges are integrally vulcanized and bonded. As will be observed, one alternate sequence of the flanges is particularly resistive to forces transmitted normal to the plane of the plate in one direction and having rubber-metal separation tendencies, and the other alternate series of the flanges is particularly resistive to oppositely applied forces and tendencies. Preferably the plate is reinforced against longitudinal deflection by stamping the plate with longitudinal ribs 20 extending between the countersinks and deflected toward the inside of the pad.

As illustrated in FIGS. 2 to 4, the plate 14 is molded into the rubber at the inside of lateral openings or voids 21 which may be formed in any suitable pattern or arrangement within the rubber body 10 to soften its cushion qualities. Thus the flanges 19 will be disposed directly inwardly from but in rather close proximity to the voids 21. Flanges 18, which may be somewhat narrower (outwardly from the plane of the plate) than flanges 19, also are imbedded in the rubber with spacing at 22 close to the inner face of the pad in relation to the body thickness. As illustrated in FIGS. 2 and 3, the body 10 may be recessed at 23 inwardly of the pad-body inner face 24, and further recessed at 25 about and inwardly from the screws 13. Ordinarily in the molding operation, the plate will be at least thinly coated with rubber 26 within the recess 25. The rubber at 22 between the recesses 25 more deeply imbeds the plate and thus presents an increased thickness of rubber about and bridging across between the recesses 25.

In the application of the pad tightly to the gun stock, the shape and peripheral extent of the plate in relation to the outer portion of the body, assures strong retention of the body against the stock, which retention is preserved by precluding the possibility of rubber separation from the plate the function and result achieved by the oppositely deflected peripheral flange sections 18 and 19.

I claim:
1. A recoil pad applicable to the end of a gun stock, comprising,
  (A) a rubber cushion body peripherally shaped in accordance with the stock and having an inner surface engageable against the end face of the stock, and
  (B) a metallic plate embedded in said body and spaced from and generally paralleling said inner surface, said inner surface, said plate being peripherally spaced inwardly from the body periphery and having integral successive flange segments bent oppositely from the plane of the plate, said plate and flange segments being integrally bonded to said body.

2. A recoil pad according to claim 1, in which said plate has screw holes near opposite ends of the plate between said flange segments at opposite sides thereof.

3. A recoil pad according to claim 1, in which said plate is a steel stamping having an indented rib extending longitudinally between end portions of the plate containing screw holes.

4. A recoil pad according to claim 1, in which screw passing openings extend through the plate and body at the inside of the plate, the body having recesses about said openings and being bridged across by increased thickness rubber between the recesses.

5. A recoil pad according to claim 4, in which said inner stock engaging surface of the body surrounds and extends beyond said increased thickness rubber between the screw openings.

6. A recoil pad according to claim 5, in which said plate is a steel stamping having indented ribs extending longitudinally between the end portions of the plate containing the screw openings.

References Cited in the file of this patent

UNITED STATES PATENTS

| | | |
|---|---|---|
| 1,128,037 | Perkins | Feb. 9, 1915 |
| 1,331,074 | Marble | Feb. 17, 1920 |
| 1,842,528 | Knight | Jan. 26, 1932 |
| 1,861,234 | Knight | May 31, 1932 |
| 1,951,135 | Emswiler | Mar. 13, 1934 |
| 2,344,752 | Utz | Mar. 21, 1944 |
| 3,007,272 | Pachmayr | Nov. 7, 1961 |